July 28, 1959  A. H. DE HAAS VAN DORSSER ET AL  2,897,130
APPARATUS FOR ELECTRODIALYZING LIQUIDS
Original Filed April 5, 1950  7 Sheets-Sheet 1
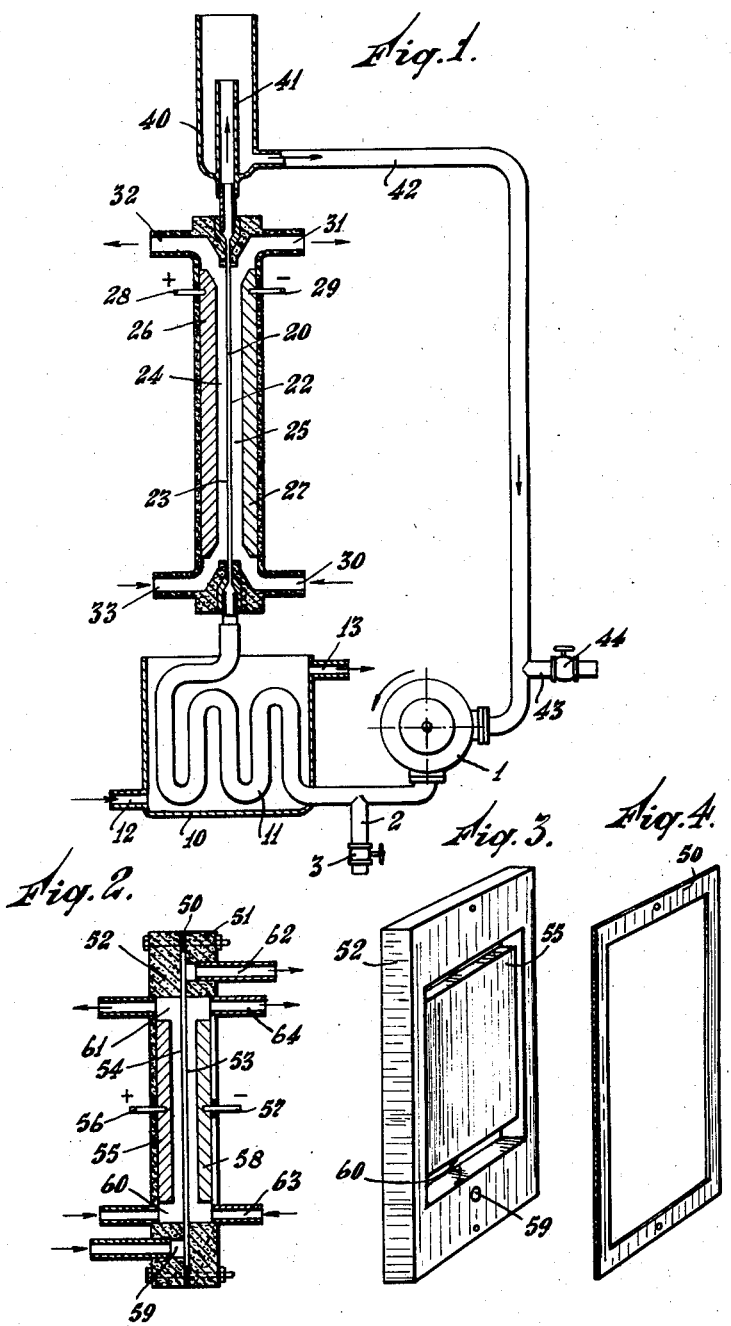
INVENTORS
AREND HUBREGT DE HAAS VAN DORSSER
CORNELIS VAN HOEK
BY Pollard, Johnston,
Smythe & Robertson
ATTORNEYS

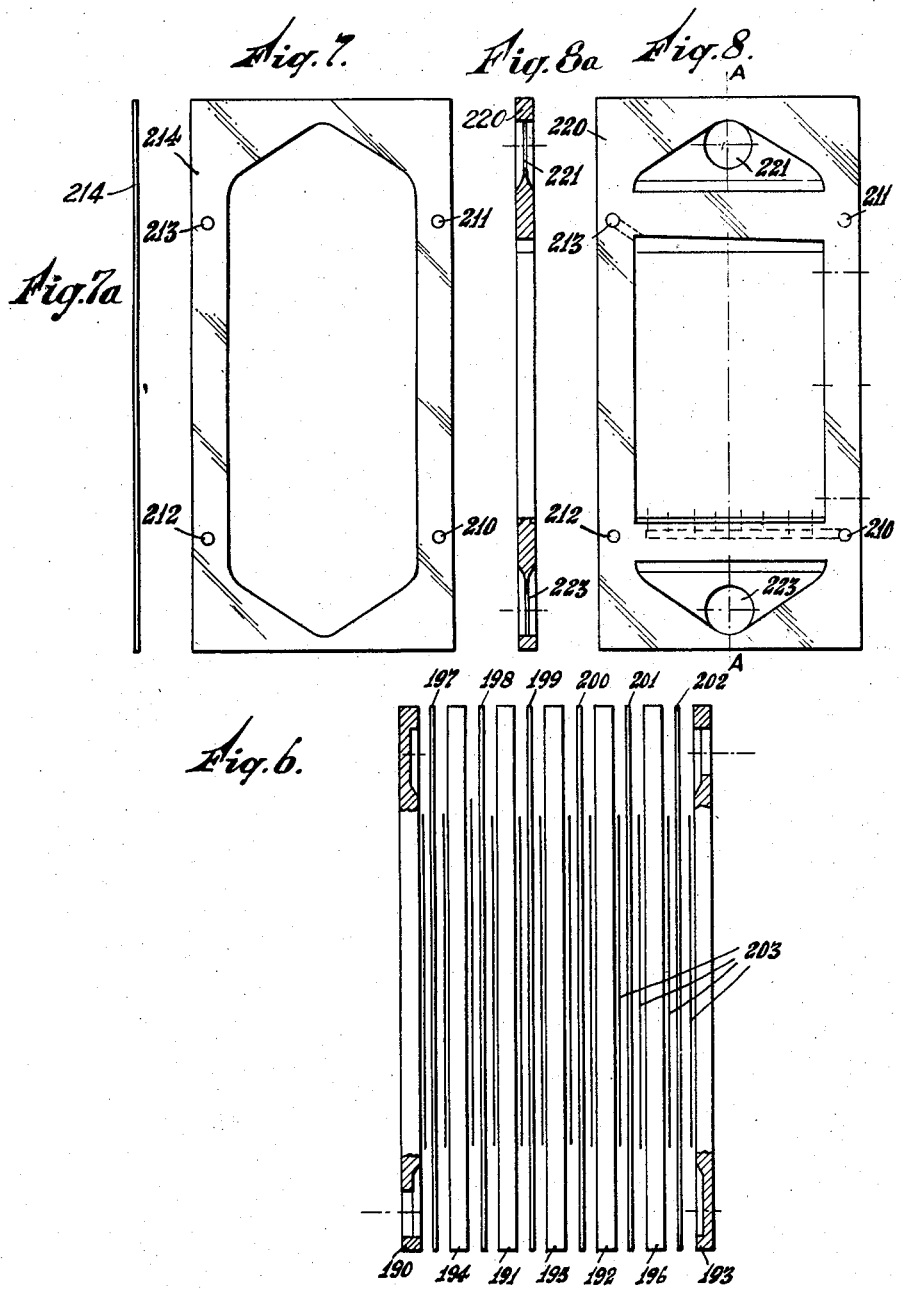

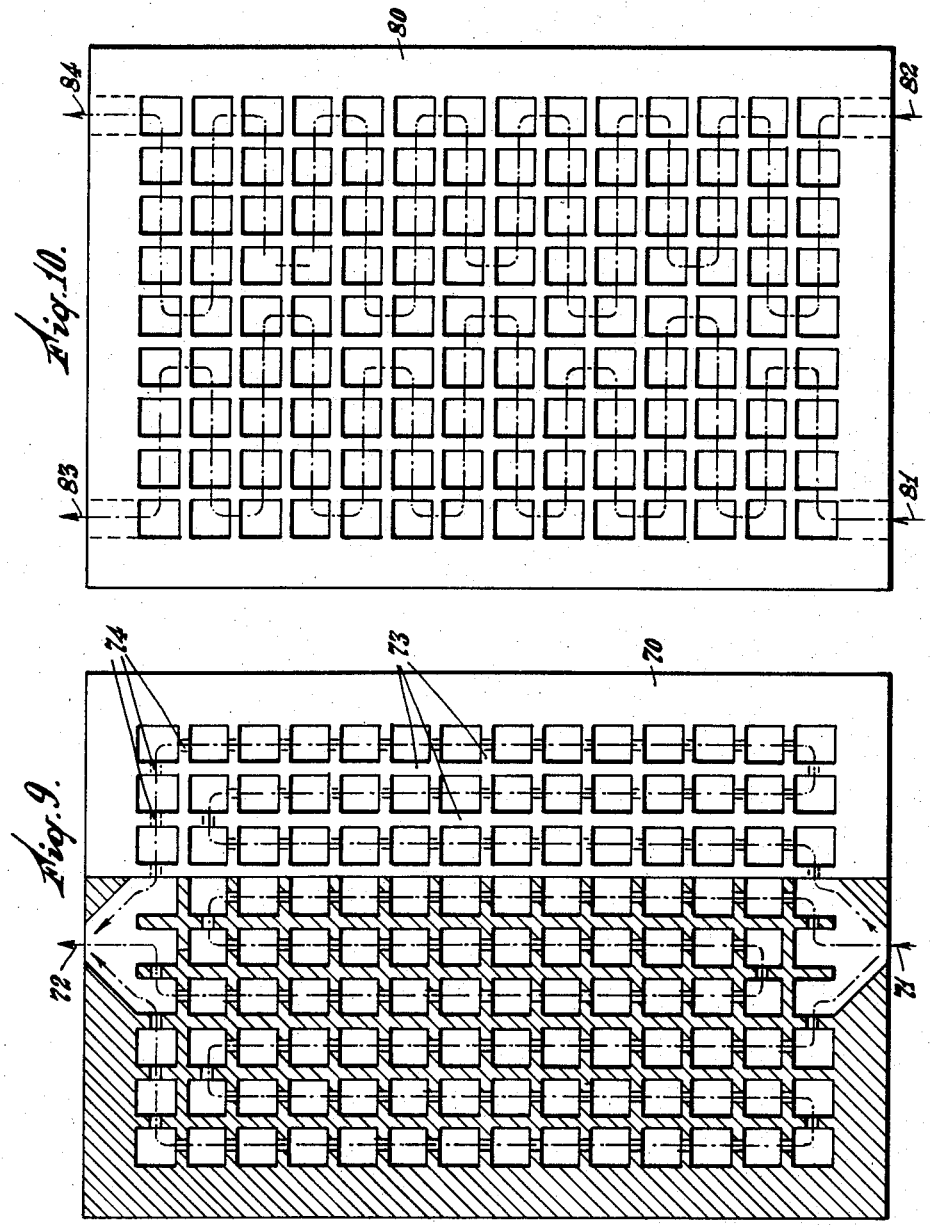

July 28, 1959  A. H. DE HAAS VAN DORSSER ET AL  2,897,130
APPARATUS FOR ELECTRODIALYZING LIQUIDS
Original Filed April 5, 1950  7 Sheets-Sheet 5
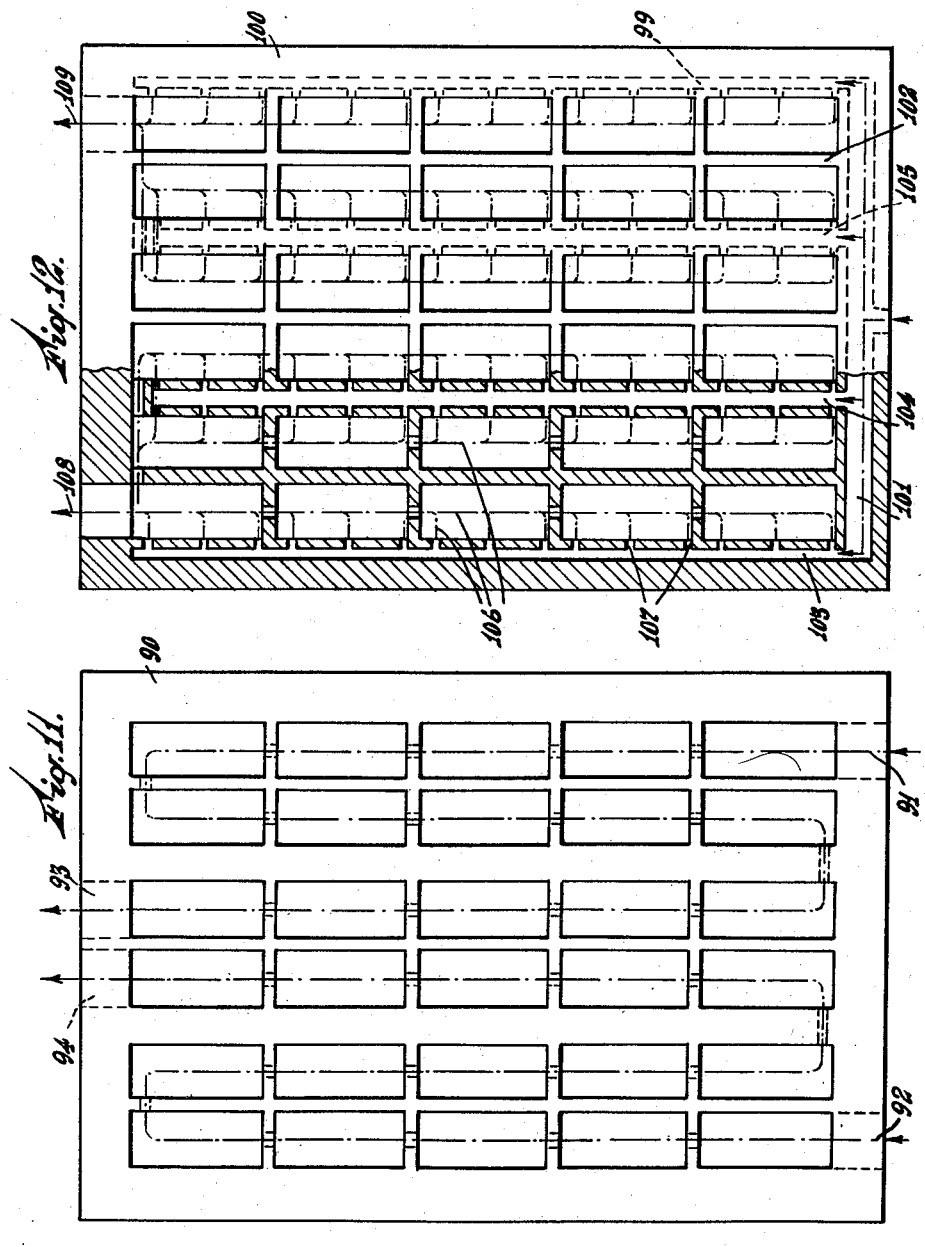
INVENTORS
AREND HUBREGT DE HAAS VAN DORSSER
CORNELIS VAN HOEK
BY
ATTORNEYS.

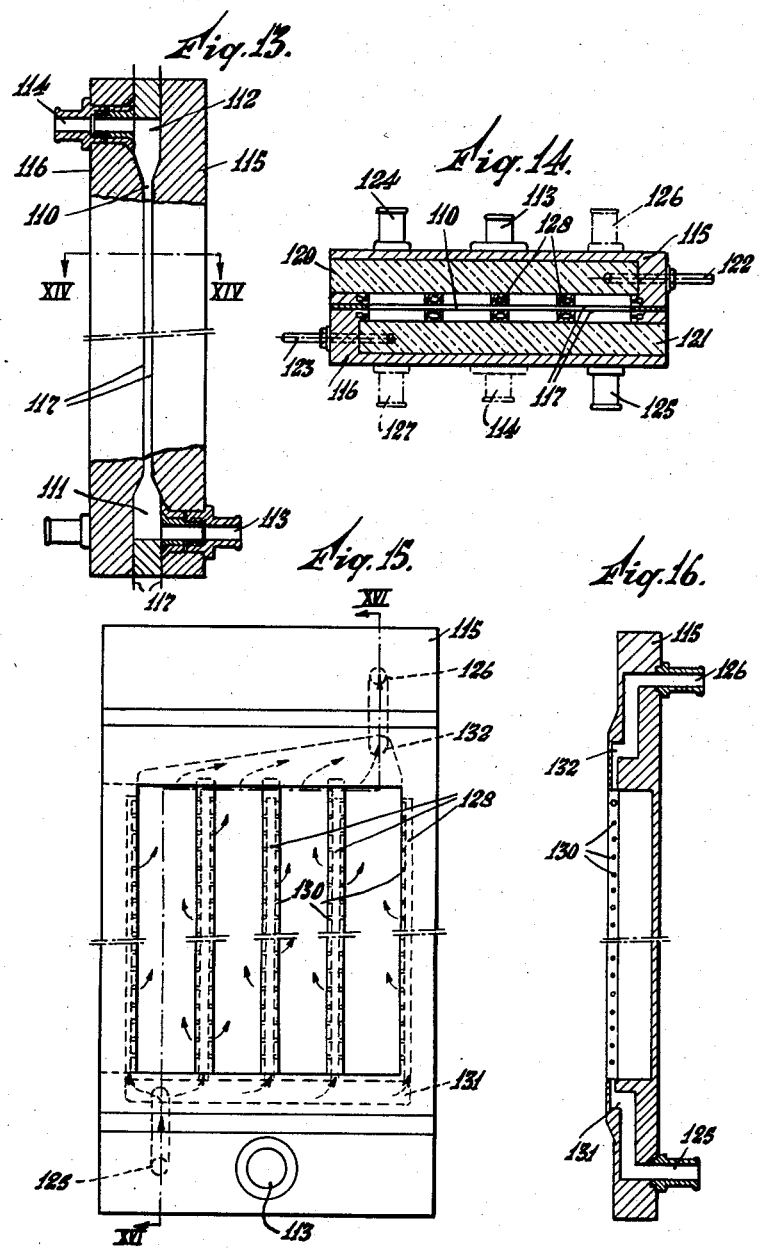

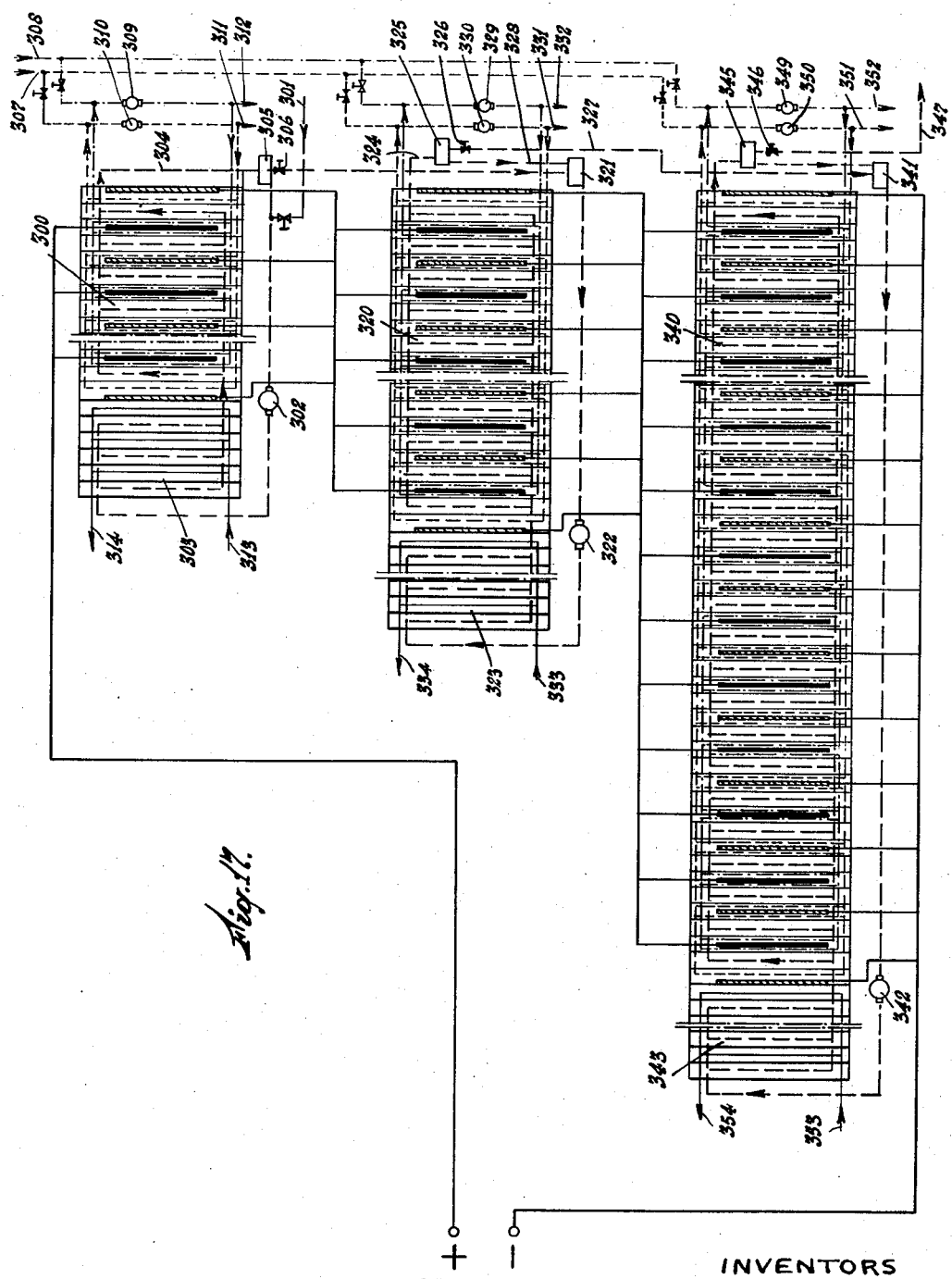

United States Patent Office 2,897,130
Patented July 28, 1959

2,897,130

APPARATUS FOR ELECTRODIALYZING LIQUIDS

Arend Hubregt de Haas van Dorsser, The Hague, and Cornelis van Hoek, Wassenaar, Netherlands, assignors to Nederlandse Centrale Organisatie voor Toegepast-Natuurwetenschappelijk Onderzoek, Netherlands, a corporation of the Netherlands Continuation of abandoned application Serial No. 154,096, April 5, 1950. This application January 18, 1956, Serial No. 559,958

3 Claims. (Cl. 204—301)

This invention relates to a new method and apparatus for electrodialyzing liquids, particularly to an improved method and apparatus with regard to the way, in which the liquid to be electrodialyzed is led through the electrodialysis cell.

This application is a continuation of our co-pending application Serial No. 154,096, filed April 5, 1950, now abandoned.

Electrodialysis deals with the removal of dissolved material from liquids.

The process according to the invention is applicable for the treatment of solutions in order to separate substances consisting of ionizable compounds contained in said solutions from the solvent and from non- or slowly dialyzing substances. These ionizable compounds are substantially removed by the process and from the remaining solution the non- or slowly dialyzable substances can be obtained in a pure state.

In many cases, however, non- or slowly dialyzing substances are subject to undesirable transformations if the pH of the solution changes in a considerable degree, e.g. sugar in solutions is apt to inversion, solutions containing colloids, for instance proteins, such as milk, whey etc., may flocculate. If a gel is formed from such flocculated matter, the pores of the membranes get choked and the removal of the ionized compounds is substantially decreased.

It is generally known, that in electrodialysis a membrane effect, known as the "Betke-Toropoff" effect, is of considerable importance. This "Betke-Toropoff" effect, first described by A. Betke and Toropoff, Zeitschrift physikalische Chemie, 88 (1914), page 686, and 89 (1915), page 597, results among other things in an accumulation of hydroxyl ions in the surface layer on the cathode side and of hydrogen ions in the surface layer on the anode side of any membrane. A quantitative theory about this much discussed phenomenon was developed by Meyer (Trans. Faraday Soc., 33 (1937), page 1073) and by Teorell (Proc. Soc. Exp. Biol. Med., 33 (1935), page 282). Meyer investigated the theory in relation to the following synthetic membranes: acetyl-cellulose, cellophane (regenerated cellulose), oxidized cellulose, glyptal, glyptal-acetylcellulose mixed, acetyl-polyacrylic acid mixed, dried nitrocellulose, polymer from condensation of phthalic anhydride and triethanolamine, and gelatin.

The observation of Betke and Toropoff may also be regarded as a polarization effect (compare L. Michaelis and A. A. Weeck, Journ. Gen. Physiol., 11 (1927–28), page 147). In accordance with Betke and Toropoff an increased Cl⁻ concentration was found immediately on one side of the membrane itself as compared with the electrolyte in the main body of the liquid, which goes along with a decreased concentration of the same ion on the other side of the membrane.

This polarization phenomenon also gives rise to local changes in the pH of the treated solutions and to electromotive forces, increased as compared with the liquid junction potential originating between two solutions in the absence of a membrane, and generally referred to as "concentration potentials," which unfavourably influence the efficiency of the electrodialysis process.

An economical application of electrodialysis requires that the cells are constructed as narrow as possible, special care being taken for a smallest possible distance between the membranes. Moreover, the condition that the pH should be constant in the cell throughout the whole liquid to be treated necessitates intensive mixing of the liquid, because it has been proved in practice that the passage of current over the relatively large membrane surface in a stagnant liquid gives rise to local changes in the pH that cause undesirable phenomena such as coagulation of macro-molecular matter, decomposition etc.

In the beginning attempts were made by the inventors to prevent these disadvantages by applying a mechanical stirrer in the middle cell of a three-cell electrodialysis apparatus, but in this case it is extremely difficult to reduce the distance between the membranes in a sufficient way, the more so as the membranes are preferably composed of thin and consequently brittle material, such as parchment, pig's-bladder, cellophane, collodium etc.

With a smaller width of the middle cell, e.g. less than 10 mm., preferably 5 to 3 mm., or with a comparatively large surface of the diaphragms, the latter will bend so far that there is a danger both of damage of the diaphragms by the mechanical stirrer, and of contact of the diaphragms with the electrodes resulting in uncontrollable changes of the H-ion-concentration in the electrodialysis cell. Moreover, when designing a stirrer, greater difficulties as to the construction are met with.

As a result of the reciprocating motion by a stirrer in a thin cell, also a periodical movement of the liquid in the electrodialysis cell is effected, which movement is transferred to the diaphragms. These deviations in the dimensions of the three cells hinder a smooth control of the H-ion-concentration in the electrodialysis cell.

Accordingly, it is an object of this invention to provide a process and apparatus for electrodialysis, wherein the liquid in the diluting cells is thoroughly mixed, so that said liquid has substantially the same composition in any part of the cell, whereby in said cell the distance of the membranes is not more than 10 mm., preferably not more than 5 or even 3 mm.

Another object is to conduct the liquid through the diluting cells in a turbulent flow, whereby the turbulence causes a thorough mixing of the liquid in the cells so as to prevent polarization phenomena, resulting in decreased power efficiency and in local changes of the pH in any part of the cells causing undesirable phenomena such as coagulation, decomposition etc.

Another object is to decrease the applied voltage in the process of electrodialysis by applying narrow cells and at the same time to increase the current density to amounts of about 100 ma./cm.² and even to 300 ma./cm.² and over by continuously leading the liquid in the diluting cell at such a rate that the flow in the cell is turbulent and the duration of treatment in the cell is reduced so as to prevent an undesirable rise of the temperature of said liquid.

Another object of the invention is to provide a dialysis apparatus that will treat a larger amount of liquid than previous systems, but with less energy consumption.

Another object is to provide a simple, efficient, effective and economic type of electrodialysis apparatus.

The invention relates to apparatus for electrodialysis, comprising an anode cell containing an anode and being rinsed by a rinsing liquid; at least one electrodialysis cell which is a diluting cell separated from the anode cell by an ion-permeable membrane, a pumping system for the flow of electrolyte solution passed through and demineralized in said diluting cell causing a turbulent flow therein; a cathode cell, separated from the adjacent diluting cell by a permeable membrane and provided with a cathode, this cathode cell also being rinsed by a rinsing liquid.

A standard for the rate of flow in the electrodialysis or diluting cells is the "Reynolds number" (hereafter to be called "Re."). If in a smooth round tube with a diameter $d$, a liquid having a specific gravity $\rho$ and a viscosity $\eta$ is streaming at a linear velocity V, Re. amounts to $$\frac{Vd\rho}{\eta}$$

If the section of the tube is not circular but rectangular and the one dimension is larger than the other, the diameter $d$ is replaced by the so-called "effective diameter $\delta$," which is directly connected with the width of the channel, narrow in one dimension and is about twice this width.

Now the flow of liquid is always laminar at a value of Re. below 1700 and always turbulent at a value of Re. above 4000. Between Re. 1700–4000 turbulence may occur i.e. as a result of roughness of the wall or of obstacles placed in the flow of liquid. Turbulence is also stimulated if the liquid is forced to change its direction. Therefore, this lower limit (hereafter to be called "Re.cr.," i.e. the critical value of Re.) is different in each apparatus, but it varies between 1700 and 4000.

Accordingly, in the process of the invention such a rate of flow for the liquid to be desalted is provided that in the diluting cells Re. is larger than Re.cr. As is shown from the foregoing, this can be effected in the first place by taking a suitable pumping rate. Further Re.cr. can be influenced (be it only within rather narrow limits) by the choice of the geometrical configuration of the inner surfaces in the electrodialysis cell. Some examples are given in the embodiments.

Especially when electrodialyzing colloidal solutions, it is important to make sure of proceeding above Re.cr., because otherwise deposits are formed on the diaphragms.

When proceeding according to the invention, the dimension of the electrode cells in the direction of the electric current may be small, e.g. 10 mm., or even 5–3 mm., which is very economical in respect to the consumption of electric energy.

The thin cell, through which the liquid to be electrodialyzed is led at a high rate, has also the advantage that high current densities can be used without too large a difference of temperature between supply and discharge of said liquid. Said liquid may be led through one or more cells (as required) and cooled to the desired temperature of entry in a cooler, whereupon the liquid may be led again through one or more cells, whether or not the same as mentioned before.

Various embodiments of apparatus for satisfactorily carrying out the present process are possible.

An electrodialysis cell or diluting cell of a rectangular cross-section without further devices may be chosen, if only the right pumping rate is applied.

The cells may be made in the form of flat frames of any suitable electrically non-conducting or bad conducting material, e.g. synthetic resin or rubber, or of insulated metal.

If the dimensions are great, it is advantageous to make the frames for the electrode compartment of metal, electrically insulated with a surface layer of insulating lacquer or resin; the frames of the diluting cells may consist of an electrically non-conducting material such as a synthetic resin or rubber.

In order to lower Re.cr., a grating with bars may be attached so as to divide the diluting cells into a number of separate sections, which together form the total volume of said cell.

In this case a grating can be attached in each of the adjoining cells too, e.g. with the same profile as that of the diluting cells with the result that bending of the diaphragms or membranes can be limited to a high degree, because they can freely move only over small surfaces.

The bars of the gratings have to be provided with perforates so that the sections in each cell are mutually connected. The course of the flow of liquid through the respective cells can be regulated as desired by perforating the bars accordingly.

In both electrode cells the bars of the grating can also be provided with the supply channels for the rinsing liquids and with the holes for distributing these liquids over the rinsing chamber.

Preferably the gratings are made in the form of frames so as to form one whole with the outer wall of the chamber. Also corrugated gratings combined with corrugated electrode surfaces may be applied instead of flat gratings. The gratings may be made of any suitable electrically non-conducting or poorly conducting material, preferably such as a synthetic resin, or rubber.

The liquid to be electrodialyzed may be circulated through one diluting cell or successively through a number of separate cells.

The above mentioned and other features and objects of this invention and the manner of attaining them will become more apparent and the invention itself will be best understood, when referring to the following description of specific embodiments of the invention together with the accompanying drawings, which are only given in order that the invention may be better understood but do not limit its scope, and wherein:

Fig. 1 is a schematic view of a three cell electrodialysis apparatus with a continuous flow of liquid through all three cells.

Fig. 2 is a schemtaic section of a simple embodiment of a three cell electrodialysis apparatus according to this invention.

Fig. 3 is a perspective view of one of the outer compartments of the apparatus according to Fig. 2, and Fig. 4 is a perspective view of the middle compartment according to Fig. 2.

Fig. 6 represents a projection of the elements of the apparatus of Fig. 5 in a situation wherein the frames are not pressed the one against the next.

Figure 5:
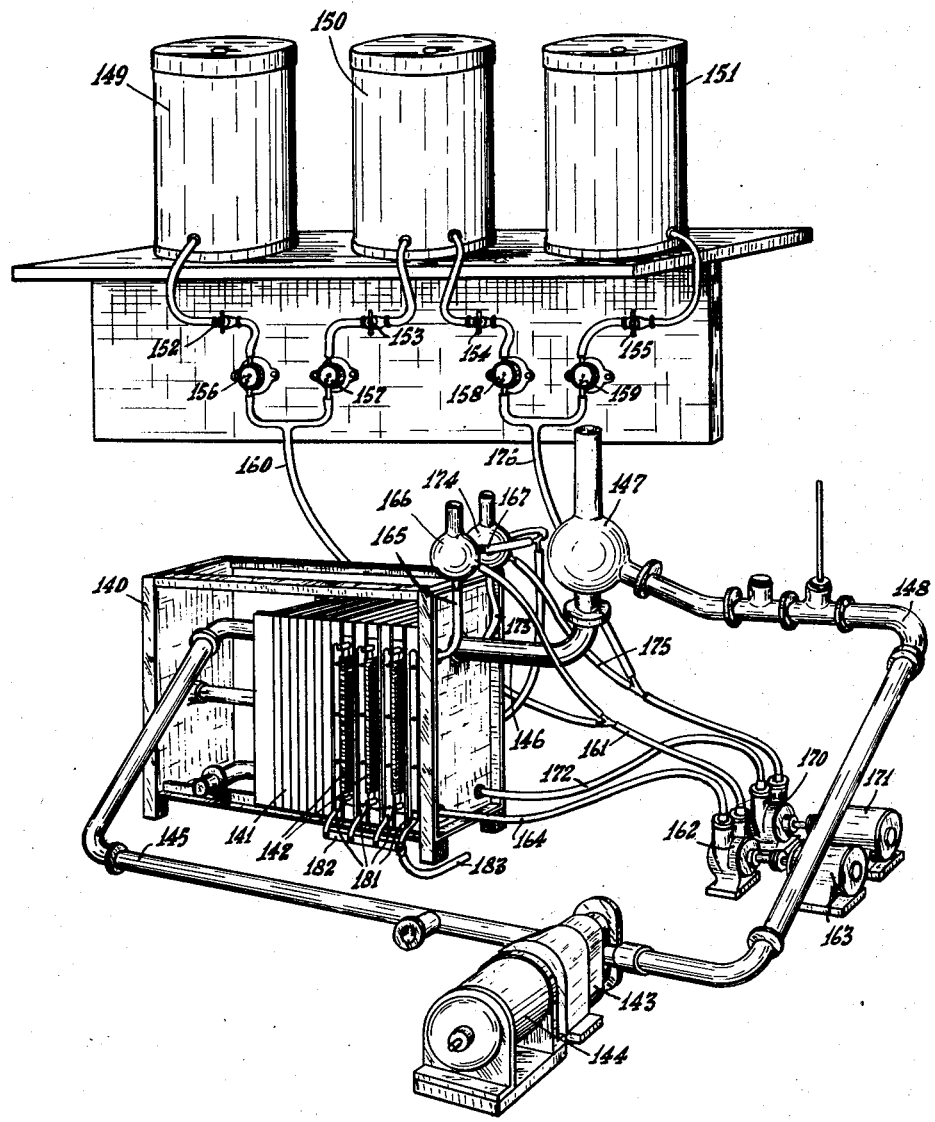
Fig. 5 represents a perspective view of a semi-commercial apparatus, consisting of a junction of six electrodialysis cells in turn alternated with a cathode cell and an anode cell, and the pumps, ducts etc. belonging to them.

Figs. 7 and 7a, respectively, represent projections in two different planes of the frame of an electrodialysis cell of Fig. 6.

Figs. 8 and 8a, respectively, represent projections in two different planes of the frame of an electrode cell, according to Fig. 6.

Fig. 9 and Fig. 10 represent plan views of various embodiments of gratings for an electrodialysis cell.

Fig. 11 also represents a grating for an electrodialysis cell and Fig. 12 a partial section of a frame for an electrode chamber, belonging to the frame of the electrodialysis cell of Fig. 11.

Fig. 13 is a view and partial section of a frame for an electrode chamber, belonging to the frame of the electrodialysis cell of Fig. 11.

Fig. 13 is a view and partially a section of a three chamber apparatus with a very narrow middle cell.

Fig. 14 shows a section through the line XIV—XIV of Fig. 10.

Fig. 15 is a view of a rinsing cell of an apparatus according to Fig. 13.

Fig. 16 shows a section through the line XVI—VXI of Fig. 15.

Fig. 17 is a schematic view of a commercial apparatus.

Fig. 1 shows a scheme of a small electrodialysis apparatus. The liquid to be treated or purified is forced by the pump 1 through the conduit pipe 11, being in the water-jacket 10, having a water inlet 12 and a water outlet 13, into the electrodialysis cell 20. According to the invention, the distance between the membranes 22—23 has to be less than 10 mm. and the rate of flow of the liquid through the cell 20 such, that the liquid is in turbulent motion. Membrane 22 separates the middle cell from the cathode cell 25. This cathode cell has an inlet 30 and outlet 31 for the cathode rinsing liquid. The cathode is indicated with 27 and a connection 29, passing with a watertight and isolating packing ring through the wall, serves for connection with the electric current.

Accordingly on the other side the anode membrane 23 separates the middle cell from the anode cell 24, said anode cell having an inlet 33 and an outlet 32 for the anode rinsing liquid. The anode 26 is connected with bolt 28, mounted watertight and electrically insulating in the wall, this bolt serving for the electrical connection. From the electrodialysis cell 20 the liquid is led through conduit pipe 41 into the expansion vessel 40, which vessel is open on the upper side or at least is freely communicated with the open air. In this expansion vessel instruments for measuring the pH and the electric conductivity may be placed. From this vessel the liquid flows through conduit pipe 42 back to pump 1 and is again forced through the cell. If the ash-reduction process is sufficiently advanced, the purified liquid can be removed through conduit 2 by the opening of valve 3.

The process can also be carried out continuously, by adding regularly a small quantity of raw liquid, e.g. through conduit 43 and valve 44 and removing an equal quantity of purified liquid from the expansion vessel.

Figures 2, 3 and 4 show embodiments of a very simple electrodialysis apparatus according to the invention.

The composing parts are three frames. 52 represents the anode cell with inlet 60 and outlet 61 for the rinsing liquid, anode 55 with connection 56 mounted insulating and watertight in the wall. The membrane 54 is clenched between frame 52 and frame 50, the latter forming the wall of the middle cell. Membrane 53 separates middle cell and cathode cell and is clenched between frame 50 and frame 51 representing the cathode cell. This cathode cell has an inlet 63 and an outlet 64 for the rinsing liquid and a cathode 58 with a connection 57.

In frame 52 the aperture 59 serves for the supply of the liquid to the middle cell and aperture 62 in frame 51 forms the outlet for said liquid.

In Fig. 5 the frame 140 contains a refrigerator 141 and a combination of six electrodialysis cells 142, separated in turn by an anode and a cathode cell. The liquid to be purified is pumped round by pump 143 driven by a motor 144, through conduit pipe 145, refrigerator 141, electrodialysis cells of the apparatus 142, conduit pipe 146, expansion vessel 147 and returns by conduit pipe 148 to the pump.

The anode rinsing liquid is circulated by pump 162 driven by motor 163 through conduit pipe 164, the anode cells of the electrodialysis apparatus 142, pipe line 165, expansion vessel 166 and returns by conduit pipe 161 to the pump. Fresh liquid is continually supplied through conduit pipe 160 from the vessels 149 containing a dilute acid and 150 containing a solution of an ionizable salt, in a quantity, regulated by regulators 156 and 157. The surplus is removed by overflow 167 from said expansion vessel 166.

The cathode rinsing liquid is circulated by pump 170 driven by motor 171 through pipe 172, the cathode cells of the electrodialysis apparatus 142, pipe 173, expansion vessel 174 and returns through pipe 175 to the pump.

Fresh liquid is continually supplied through conduit pipe 176 from the vessels 150 containing an ionizable salt solution and 151 containing a solution of an alkali, in a quantity, regulated by regulators 158 and 159. The surplus is removed from the circuit by overflow 167.

The current supply to the anodes is reproduced by wire 183, copperstrip 182 and conection bolts 181. The current supply to the cathodes and the water cooling conduit pipes for the refrigerator 141 are not visible in the figure.

152, 153, 154 and 155 are stop cocks between the vessels 149, 150, 151 and the regulators 156—159.

Fig. 6 represents a projection of all the elements of the electrodialysis cell of Fig. 5, placed apart for the sake of convenience. 190—193 represent the cathode cells, each containing a cathode, 194—196 represent the anode cells, each containing an anode and 197—202 represent the electrodialysis cells. The membranes 203 are pressed between an electrodialysis cell and an electrode cell when the apparatus is assembled.

Figs. 7 and 7a are projections of an electrodialysis cell in two planes. 214 is the frame with an aperture 210 for supply of the cathode rinsing liquid, aperture 213 for removal of said liquid; 211 and 212 being for supply and removal of anode rinsing liquid.

Figs. 8 and 8a are, respectively a projection of a cathode cell and a section at line A—A of Fig. 8. 220 is the frame, 223 is the supply of the liquid for the electrodialysis cell, and 221 the aperture for removal of said liquid.

In Fig. 9, 70 represents a frame of electrically nonconducting or poorly conducting material, preferably an electrically insulating material, which can be easily pressed or moulded, such as synthetic resin or rubber. The gratings are indicated with 73, the holes 74 connecting the respective chambers. The liquid is supplied to the cell at 71, is distributed into three parallel branches, indicated by the dotted lines, and is discharged from the cell at 72.

Fig. 10 shows a similar framework 80, whereby the liquid enters at 81 and 82 and flows through two parallel branches to the discharges 83 and 84.

Fig. 11 shows an embodiment of a frame 90 for the electrodialysis cell. The liquid is supplied to the cell at 91 and 92 and is discharged at 93 and 94.

Fig. 12 shows a frame 100 belonging to that of Figure 11, for the electrode cells. The rinsing liquid is supplied and divided by a duct 101 over the four inner channels 102, 103, 104 and 105. From these channels the rinsing liquid is supplied to the electrode cells 106 via holes 107 and discharged again via 108 and 109.

The membranes are clenched between the frame of the middle cell according to Fig. 11 and the corresponding parts of the frames of the electrode cells according to Fig. 12. This prevents or limits to a high degree bending or sagging of the membranes, because they can freely move only over small surfaces.

Figs. 13–16 show another modification of a single apparatus. Fig. 13 shows the middle cell 110, being of small dimension in the direction of the electric current and provided on the lower and upper side with a wider part 111, 112, with the opening for supply 113 and discharge 114. 115 and 116 are rinsing cells, 117 representing the diaphragms.

In Fig. 14, 120 and 121 represent the electrodes and 122 and 123 the contact pins for the current; 124 and 126 the inlet and outlet for the rinsing liquid of the first electrode cell; 125 and 127 inlet and outlet for the second cell. 128 are gratings with holes for the supply of the rinsing liquids.

In Fig. 15, 131 is the duct through which the rinsing liquid is supplied to the rising cell, 128 the grating with the tubes, provided with holes 130 for the distribution of the rinsing liquid throughout the rinsing cell and an opening 132 for the discharge of the rinsing liquid together with the generated gas.

In Fig. 17, 300, 320 and 340 indicate a battery of electrodialysis cells of respectively 20, 35 and 70 cells. In each group the cells are parallel for the liquid to be purified.

The liquid to be purified is supplied through pipe-line 301 and driven by pump 302 through refrigerator 303 to the battery 300 and through pipeline 304 from the cells to expansion vessel 305.

From this vessel part of the liquid is led through valve 306 to an expansion vessel 321 of battery 320, and the remaining part, mixed with fresh supply liquid, is led back to pump 302.

Battery 320 is arranged in a similar manner with a pump 322 and a refrigerator 323; it is different from the first group in that the liquid streaming from the cells through line 324 first enters an expansion vessel 325, from which vessel part of it is led by valve 326 and line 327 to an expansion vessel 341 of the third group, the remaining part flowing through line 328 to the expansion vessel 321.

The third group consists of expansion vessel 341, pump 342, refrigerator 343, electrodialyzing cells 340 and an expansion vessel 345, from which the purified, desalted liquid is removed through valve 346 and pipeline 347.

The electrode rinsing liquids are supplied by pipelines 307, 308 to each of the three groups of cells, each group having a pump for the circulation of each rinsing liquid, indicated by 309, 310, 329, 330 and 349, 350. The surplus of the rinsing liquid is removed from the circulation circuits by pipelines 311, 312, 331, 332 and 351, 352.

The cooling water for the refrigerators is supplied by lines 313, 333 and 353 and removed by lines 314, 334 and 354.

Examples of purification by electrodialysis in apparatus of the types described and according to the method of this invention are given below.

*Example I.*—The press juice, resulting from the production of fish meal from sea fish contains oils and fats, and a water phase. This water phase contains about 8% soluble proteins and 6% ash. 6 l. of this "slick water" were electrodialyzed for 5 hours in an apparatus according to Figure 1, the surface of the membranes being 16 x 37 cm.$^2$ and the distance 21 of the membranes 4 mm.

The voltage applied at the start was about 6 v.; at the end this has increased to about 15 volts, according to the decrease of the conductivity of the solution. The current was about 70 amp. at the start, e.g., 140 m. amp. per cm.$^2$ of membrane area; the total energy consumption 3.0 kw. h. The slick water was pumped around through the cell with a pumping-velocity of about 2000 l. per hour, the Reynolds number being about 3200 with a viscosity of the liquid of about 2.2 c. poise. Each electrode liquid is pumped round at a velocity of about 120 l. per hour; the anode rinsing liquid is refreshed by continual addition of 6 l. tapwater and 1–3 l. 0.4 n Na$_2$SO$_4$ solution per hour; the cathode rinsing liquid by addition of 6 l. tapwater per hour.

The resulting product contained about 8% protein and 0.6% ash; the pH of the liquid in the electrodialysis cell could be maintained in any point of the cell, varying the addition of 0.4 n Na$_2$SO$_4$ solution to the anode rinsing liquid, within the range of pH 6.7 to 7.5, and at this pH there was no flocculation of protein. On concentrating the resulting purified liquid an isinglas of an excellent quality is produced.

*Example II.*—A normal beet-sugar molasses is diluted with water to a product with a solids content of 40.8% and an ash content of 3.9%. This product is electrodialyzed in an apparatus, according to Figs. 5 and 6 at a current varying from 350 to 250 amperes and at a tension, ranging from 14 to 30 volts, the average total energy consumption per hour being somewhat less than 6 kw. h. The resulting purified molasses has an ash content of only 0.7% and a sugar content of about 35%; the capacity is about 8 kg. per hour. The distance between the membranes is about 0.25 cm.; the surface of each membrane 37 x 16 cm.$^2$. The current density varies from 70–100 m. amp./cm.$^2$. The molasses is pumped round at a velocity of about 15.000 l./hour. The viscosity of the liquid is about 3.0 c. poise; the Reynolds number Re. nearly 2900. The electrode rinsing liquids are pumped round at a velocity of about 300 l./hour. The anode rinsing liquid is refreshed with a quantity 0.06 n H$_2$SO$_4$, ranging from 0–25 l./hour and a quantity of 0.5 n Na$_2$SO$_4$ of also 0–25 l./hour, according to the change of the pH in the molasses. The cathode rinsing liquid is refreshed by adding continually 24 l. 0.02 n NaOH per hour. In this manner the pH of the molasses could be maintained at about 7 in any point of each diluting cell and there were no difficulties about inversion or flocculation. After decolorization and concentration of the product, produced by this process, a syrup, perfectly fit for human consumption is obtained.

*Example III.*—In an apparatus similar to that of Example II, but with membranes of 16 x 50 cm.$^2$ instead of 16 x 37 cm.$^2$, 30 kg. of the syrupy liquid resulting from the removal of milksugar from concentrated whey, viz. milksugar molasses is electrodialyzed. After dilution, this milksugar molasses contains about 35% of solids and about 10% of ash, the other components are mainly milksugar and albumin. The current amounted to about 700 amp., the voltage 8–15 volt, the energy consumption for a batch operation of three hours being 23 kw. h. and the current density 146 m. amp./cm.$^2$.

The pumping velocity has to be at least 20,000 l./hour; the viscostiy of the liquid is about 4.2 c. poise and the Reynolds number Re.=2700. Velocity and composition of the electrode rinsing liquids are the same as in the preceding example; the pH of the milksugar molasses is maintained at about 7.5.

After three hours the ash content is reduced to 3.7%; the percentage of solids being 28%. After spray-drying a protein containing milksugar product is gained, fit for a component in baking cream, for a substitute of egg-powder in bakery products etc.

*Example IV.*—Concentrated whey with a solids content of about 40% is electrodialyzed in an apparatus according to Figure 17. The output per hour is about 100 kg.; the ash-reduction is at least 80%.

The total number of electrodialyzing cells amounts to 125, these being arranged in a first group of 20, a second of 35 and a third of 70 cells. The current is 2000 amp.; the tension of the groups is 12, 12 and 15 volts respectively and the energy consumption for the electrodialysis is 78 kw. h. per hour. The pumping velocity of the whey in the three groups is 60.000 l., 100.000 l. and 200.000 l. per hour, the viscosity is 3.8 c. poise, surface of the membranes 15 x 40 cm.$^2$ and the membrane distance about 0.25 cm., the Reynolds number is about 2900, 2700 and 2700. With these flow velocities clogging of the membranes, caused by coagulation of protein in the surface layers of the membranes, is completely prevented, which is a proof that local changes in the pH are substantially prevented. The current density in the three groups amounts to 166, 95 and 48 m. amp./cm.$^2$. The electrode rinsing liquids are pumped round in the three groups in quantities of respectively 1000, 1500 and 3000 l./hour. In all of the groups the amount of fresh liquids supplied to the cathode cells is 100 liters of 0.01 n alkali solution per hour; to the anode cells 100 liters of 0.02 n sulfuric acid per hour and a quantity of 0.5 n Na$_2$SO$_4$ solution, varying from 0 to 400 l./hour, as required for the maintenance of a pH between 6.8 and 7.2 of the whey, are supplied.

On spray drying, 100 kg. of the desalted product gives 40 kg. of a whey powder with an albumin content of 13% and a lactose content of about 85%, fit for human consumption. The total consumption of electrical energy for the electrodialyzing process and the pumps amounts to about 2 kw. h. per kg. dry product.

*Example V.*—Sour milk can be brought back in good condition by electrodialysis. In an apparatus as in Example I, 50 l. of milk of 26° D. can be brought to 16° D. per hour, when applying a current of 60 amp. and a tension of about 50 volts. The pumping velocity of the milk has to be not lower than 1800 l./hour. The pumping velocity of the rinsing liquids is 100 l./hour; the supply for the cathode liquid amounts to 4 l. 0.02 n NaOH solution per hour and the supply for the anode liquid to 12 l. 0.5 n NaCl solution. The pH of the sour milk of about 6 is brought back to the value of the pH of fresh milk of about 6.9–7.0.

We claim:

1. An apparatus for continuously electrodialyzing an electrolyte solution, comprising at least one electrodialysis cell and electrodialysis membranes bordering the opposite sides of said electrodialysis cell, said cell having an inlet and an outlet for said electrolyte solution, and a spacer in said cell in contact with both of said membranes, said spacer being constituted by a plate having over its whole area contiguous to the electrodialyzing surface of said membranes a substantially uniform thickness of less than 10 mm., said plate being cut away completely at a multiplicity of locations spaced apart over said area to provide in a pattern between said membranes a multiplicity of distinct completely open spaces separated each from others by intervening remaining portions of said plate, each of said intervening plate portions symmetrically contacting both of said membranes at its opposite sides, said membranes lying against said plate portions and closing the opposite sides of each of said open spaces to form said spaces into distinct chambers, said chambers being interconnected, each with at least one other, by turbulence-promoting narrow throats extending through said intervening plate portions, said chambers and said throats collectively forming between said membranes at least one elongated winding passageway for said solution extending parallel to said membranes from said inlet to said outlet.

2. An apparatus as described in claim 1, and a spacer at each side of said electrodialysis cell, having substantially the same configuration as said spacer in said electrodialysis cell, said membranes being clenched between the several spacers.

3. An apparatus as described in claim 1, said throats extending through said intervening plate portions in a medial plane of said plate substantially equidistant from its opposite sides.

References Cited in the file of this patent

UNITED STATES PATENTS

| 1,738,372 | Edgeworth | Dec. 3, 1929 |
| 1,849,622 | Heibig | Mar. 15, 1932 |
| 1,986,920 | Cross | Jan. 8, 1935 |
| 2,093,770 | Billiter | Sept. 21, 1937 |
| 2,127,791 | Stevens | Aug. 23, 1938 |
| 2,354,553 | Sherk | July 25, 1944 |
| 2,571,247 | Huebotter | Oct. 16, 1951 |
| 2,631,100 | Aten | Mar. 10, 1953 |
| 2,689,826 | Kollsamn | Sept. 21, 1954 |
| 2,708,658 | Rosenberg | May 17, 1955 |

FOREIGN PATENTS

| 211,562 | Great Britain | Feb. 20, 1924 |
| 391,068 | Great Britain | Apr. 20, 1933 |
| 689,674 | France | June 2, 1930 |

UNITED STATES PATENT OFFICE

CERTIFICATE OF CORRECTION

Patent No. 2,897,130                                                      July 28, 1959

Arend Hubregt de Haas van Dorsser et al.

It is hereby certified that error appears in the printed specification of the above numbered patent requiring correction and that the said Letters Patent should read as corrected below.

Column 4, lines 66 to 68 inclusive, strike out the following paragraph:

Fig. 13 is a view and partial section of a frame for an electrode chamber, belonging to the frame of the electrodialysis cell of Fig. 11.

Signed and sealed this 23rd day of February 1960.

(SEAL)
Attest:

KARL H. AXLINE

Attesting Officer

ROBERT C. WATSON
Commissioner of Patents